United States Patent [19]
Oldfield

[11] Patent Number: 4,772,170
[45] Date of Patent: Sep. 20, 1988

[54] AUTOMATIC ARTICLE HANDLING METHODS AND APPARATUS

[75] Inventor: Edwin L. Oldfield, Bury St. Edmunds, England

[73] Assignee: Precision Engineering Products (Suffolk) Limited, Bury St. Edmunds, United Kingdom

[21] Appl. No.: 8,354

[22] Filed: Jan. 29, 1987

[30] Foreign Application Priority Data

Jan. 29, 1986 [GB] United Kingdom ............... 8602105

[51] Int. Cl.$^4$ .................................. B65G 57/24
[52] U.S. Cl. ................................. 414/57; 294/2; 294/119.1; 294/90.7; 414/71; 414/741; 414/786
[58] Field of Search ............... 414/57, 71, 110, 120, 414/741, 786; 294/2, 67.33, 103.1, 119.1, 907

[56] References Cited

U.S. PATENT DOCUMENTS

| | | | |
|---|---|---|---|
| 2,783,078 | 2/1957 | Billner | 294/2 X |
| 3,586,176 | 6/1971 | Rackman et al. | 414/71 X |

FOREIGN PATENT DOCUMENTS

| | | | |
|---|---|---|---|
| 36989 | 4/1965 | German Democratic Rep. | 294/119.1 |
| 58-130823 | 8/1983 | Japan | 414/71 |

OTHER PUBLICATIONS

FMC Robot Palletizer Brochure FMC Corp. Hoopeston, Ill.

*Primary Examiner*—Leslie J. Paperner
*Attorney, Agent, or Firm*—Edward R. Weingram

[57] ABSTRACT

A method of stacking boxes, cases, cartons, crates or the like using a computer-controlled apparatus having a lifting grab fitted with two independently movable grippers between which a box to be lifted may be clamped. In a first step, the grab is positioned at a loading station, the grippers are relatively separated and then the grab is lowered over the next box to be stacked. One gripper is then moved to a datum position and the other gripper is moved towards said one gripper so as to clamp a box therebetween. The grab is raised and moved together with the clamped box to a stacking station whereat the grab is finely positioned to have the box correctly placed in the stack under assembly with said one gripper alongside a previously stacked box. The lifted box is released by moving said other gripper away from said one gripper and then the grab is raised clear of the stack without disturbing the placement of the last-lifted box.

14 Claims, 4 Drawing Sheets

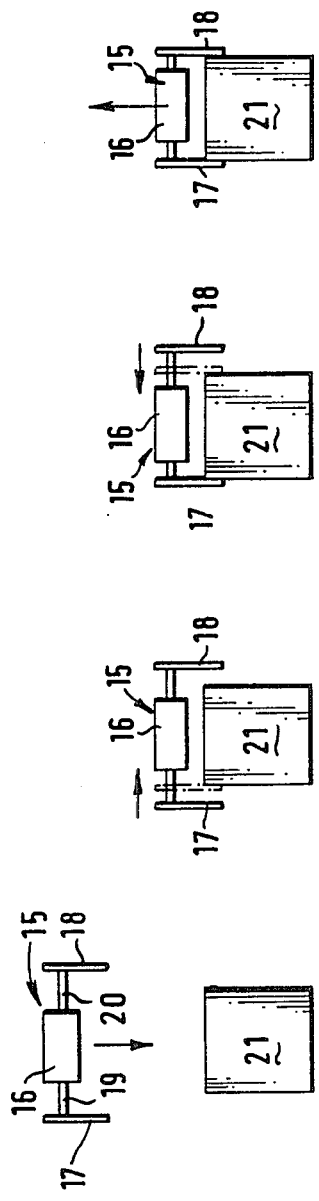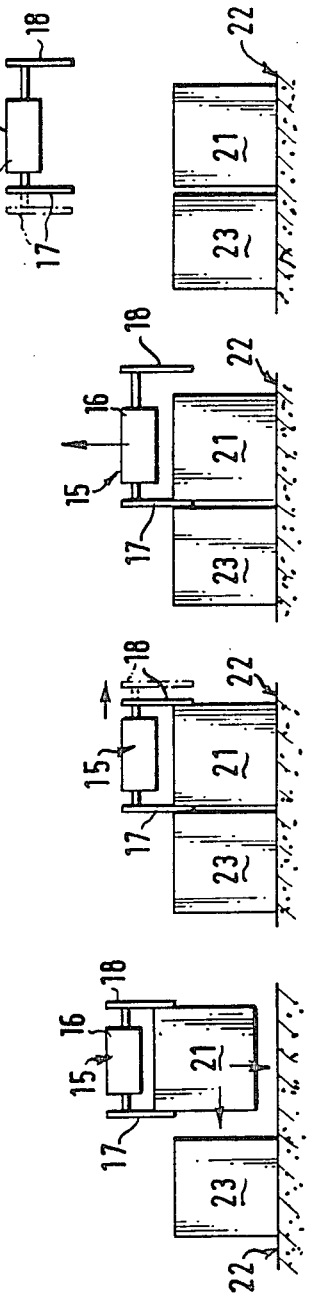

AUTOMATIC ARTICLE HANDLING METHODS AND APPARATUS

DETAILED DESCRIPTION OF THE INVENTION

1. Field of the Invention

This invention relates to a method of assembling a stack of articles such as boxes, cases, cartons, crates or the like, and also to apparatus specifically adapted to perform such methods.

2. Prior Art

At the end of a manufacturing process, it is common to pack the manufactured items in boxes, cases, cartons, crates or like containers (all of which will hereinafter for convenience collectively be referred to as 'boxes') and then to assemble a stack of such boxes on a pallet for subsequent storage or transport for distribution purposes. Typically, each box is of such a size and weight, when packed with items, that it may easily be carried and moved about by hand. As a result, it is quite common for the assembly of a stack of boxes packed with the manufactured items to be performed by hand at the end of a manufacturing line, even though the entire manufacturing process and the packing of the items into the boxes may wholly be performed automatically by suitable machinery. However, in an attempt to reduce labour costs and to ensure continuous reliable operation over long periods of time, recently there have been developed various designs of automatic stack assembling apparatus, adaptable to suit a wide variety of box sizes, packed weights, and pallet stacking requirements.

It will be appreciated that when a stack of boxes is being assembled for instance on a pallet, each layer of the stack requires the individual boxes to be positioned closely side-by-side, with minimal gaps therebetween. The consequence of this is that automatic stack assembling apparatus such as has been referred to above must be capable of lifting each individual box by the top thereof, and for this purpose various types of vacuum lifting arrangements have been designed. Unfortunately however certain types of box do not lend themselves to lifting in this way and so the stacking thereof still has to be performed manually. For example, if a container is covered with a relatively thin-gauge shrink-wrapped plastics material, that material may be so porous that vacuum lifting techniques cannot reliably be used. Also, certain grades of cardboard used for box manufacture may be so porous or have such an uneven surface that vacuum lifting again cannot be employed.

OBJECTS AND SUMMARY OF THE INVENTION

It is a principal object of this invention to provide both a method of assembling a stack of boxes (as defined herein) using automatically controlled apparatus and able to apparatus suitable for automatic control and also to assemble such a stack, which method and apparatus overcome the disadvantages discussed above for known types of stacking apparatus using vacuum lifting arrangements.

In more detail, an object of the invention is to provide a method which may be employed automatically to assemble a stack of boxes with minimal clearances between adjacent boxes in the same layer, even though each box is lifted by grippers which exert a clamping force on opposed sides of a box.

Another object of the invention is to provide an automatic box stacking method particularly suitable for use in constructing a stack of boxes with a plurality of boxes in each layer, each disposed closely side-by-side.

Yet another object of the invention is the provision of a computer-controlled, full automated boxlifting and box-depositing method allowing boxes delivered to a loading station to be assembled into a stack under the full control of a program being executed by the computer.

A further object of the invention is to provide computer-controlled apparatus which may fully automate the assembly of a stack of boxes from boxes supplied to a loading station, the stack being assembled with only minimal clearances between adjacent boxes in each layer of boxes in the stack.

Another object of the invention is to provide apparatus which may easily be adapted for use with boxes of a wide range of shapes and sizes which may nevertheless operate reliably and continuously to build a stack of closely-positioned boxes.

Accordingly, in one broad aspect of this invention provides a method of assembling a stack of boxes (as defined hereinbefore) using automatically-controlled apparatus including a lifting grab having two independently movable grippers between which the sides of a box may be clamped, which method comprises the steps of:

(a) moving the grippers to cause the relative separation thereof and then lowering the grab over a box located at a loading station;

(b) moving one of the grippers towards the other gripper until said one gripper reaches a datum position and then moving the other gripper towards said one gripper until the box is clamped therebetween with a force sufficient to permit the lifting thereof by the grab;

(c) raising the grab together with the clamped box and then moving the grab to a stack assembly station whereat the position of the grab is adjusted so as accurately to position the box held thereby for correct placement in a stack under assembly and with said one gripper alongside a previously-stacked box;

(d) releasing the box by moving said other gripper away from said one gripper; and (e) then raising the grab clear of the container without disturbing the placement thereof.

According to a second broad aspect of this invention, there is provided computer-controlled apparatus for automatically assembling a stack of boxes, which apparatus comprises:

a loading station;

a stacking station;

a grab including two grippers mounted for independent movement towards and away from each other;

first movement means to effect independent movement of said grippers, at least one of said grippers being movable towards and away from a datum position;

second movement means to effect movement of the grab in three mutually perpendicular directions and about a vertical axis within an envelope which includes said loading station and said stacking station; and a computer processing a pre-determined program of control for said first and second movement means, to enable boxes supplied to said loading station to be picked up one-at-a-time and moved to said stacking station, whereat a stack of the boxes is assembled by controlling the positioning of the grab and then releasing a held box by maintaining one of said grippers at its said datum position but moving the other said gripper away from said one gripper.

BRIEF DESCRIPTION OF THE DRAWINGS

In order that the invention may better be understood, it will now be described in greater detail, reference being made to the accompanying drawings, as necessary. In the drawings:

FIGS. 1 to 8 inclusive show eight successive steps in performing the example of the method of this invention;

DESCRIPTION OF THE PREFERRED ARRANGEMENTS

Figure 9:
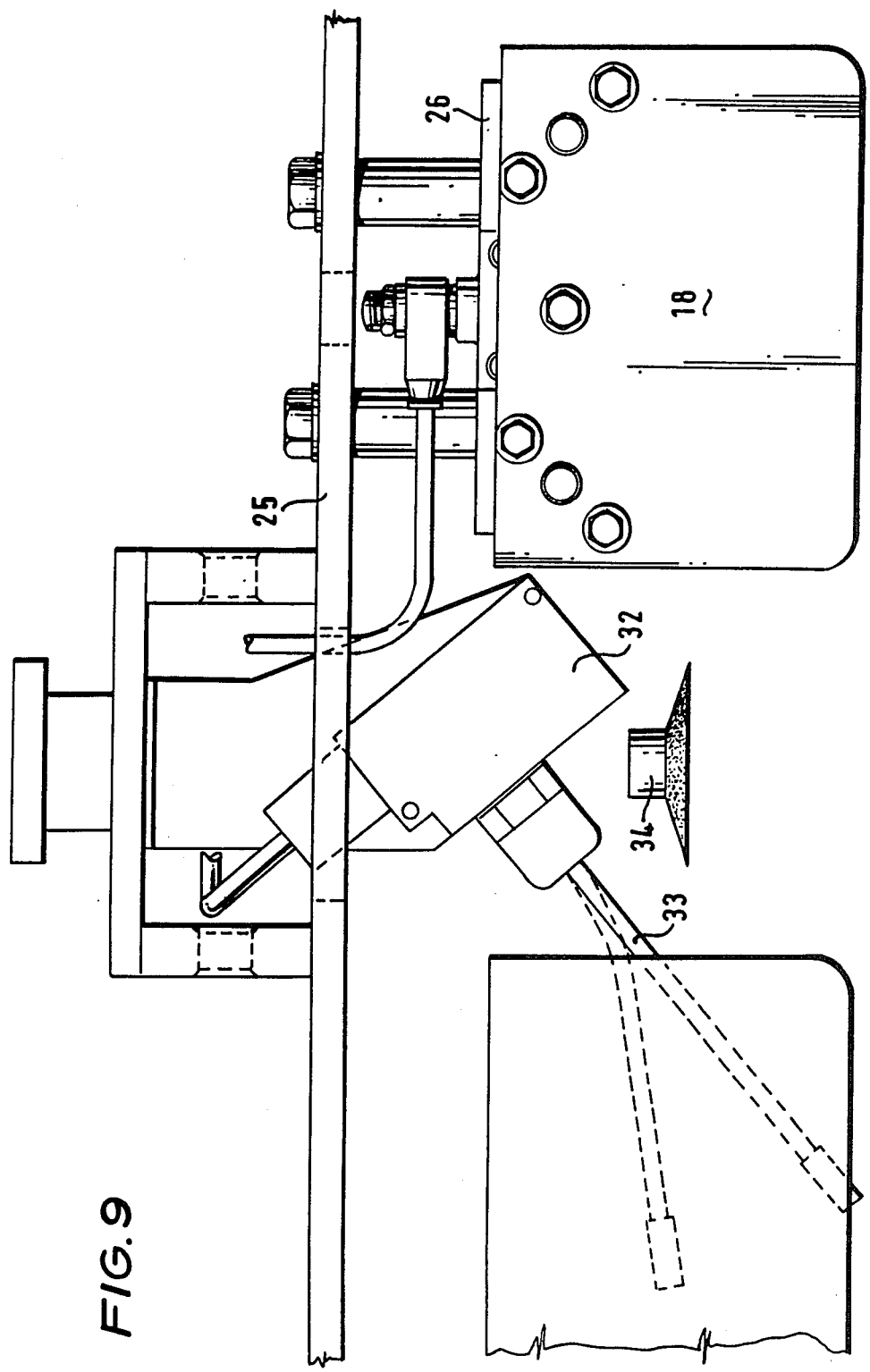
FIG. 9 is a partial side view of a grab suitable for use in performing a method of this invention.

It will be appreciated that in the method of this invention, a box is picked up by the grab of the automatic box handling apparatus by being clamped between two grippers which are urged together with an appropriate force having regard to the construction of the box and its contents. Despite the presence of the grippers on the sides of the box, a stack of closely positioned boxes may still be assembled, by virtue of the independent operation of the grippers, coupled with the sequence of operation thereof. It is consequently advantageous for each gripper to be as thin as possible, for the minimum spacing of the boxes in each layer of an assembled stack must be equal to the thickness of a gripper.

In view of the foregoing, it is most preferred for each gripper of the grab employed in the method of this invention to be in the form of a substantially flat plate, mounted on the grab for linear sliding movement towards and away from the other gripper. Though such sliding movement could be caused in any of a variety of ways, the most preferred arrangement is to have at least one pneumatic ram assembly associated with each gripper and suitably disposed to cause the sliding movement thereof.

It is most advantageous for the automatically-controlled apparatus including the lifting grab to be computer-controlled, so as to cause the group to be moved in accordance with certain directions contained in a programme executed by the computer. Thus, the apparatus may readily be re-programmed so as to permit the assembly of a stack of differently sized boxes, or with a different number of layers, a different stacking sequence, or the like. For such an arrangement, the apparatus should be capable of controlling the grab for movement in three mutually perpendicular directions lying in horizontal and vertical planes, as well as for rotation about a vertical axis, whereby the grab may be positioned anywhere within a predefined volume, and with any orientation in that volume. Such control thus readily permits the positioning of the grab over a box prior to the lifting thereof, and the depositing of a box in the required position as the stack assembly progresses.

Advantageously, the positioning of the box prior to release thereof at the correct position in a stack follows the sequence of:

(a) positioning the next box to be stacked vertically above the required final position, with the grab being rotated as necessary to have the said next box correctly aligned with respect to already-stacked boxes, but with said next box displaced laterally by a relatively small extent from previously-stacked boxes against which said next box is to lie closely adjacent;

(b) lowering said next box until it is spaced by a relatively small extent from the surface on which said next box is to rest;

(c) moving said next box laterally until said one gripper is in the desired final position and so with said one gripper substantially in the desired vertical plane for the side of the box being stacked the grab also being lowered until said next box substantially contacts the surface; and (d) releasing the box by moving said other gripper before raising the grab clear of that box.

From the foregoing, it will be appreciated that the box may be lowered substantially to its final position without any risk of that box colliding with a previously-stacked box in the same layer. Then, the box is moved laterally to its final position, which may be alongside a previously-stacked box for the case where the box being stacked is not the first box of a layer. For such a box, it will be appreciated that since said one gripper is used as a datum reference for the positioning of the grab, said one gripper should substantially touch such a previously-stacked box.

When performing the method of this invention, it will be realised that certain operations may be compounded to be performed simultaneously or may be quite separately be performed. For instance, said one gripper may be moved away from its datum position whilst the grab is stationary, whilst the grab is being lowered on to the next box to be stacked, or whilst the grab is being raised after releasing a box - but in the latter case said one gripper must not be moved until clear of the deposited box. Equally when picking up a box, both grippers may move simultaneously so long as movement of said one gripper to its datum position is assured.

The invention extends to apparatus specifically adapted for performing the method of this invention as described above. As mentioned, such apparatus is preferably computer-controlled, to permit ready amendment of the precise operating parameters to suit any given set of circumstances, for example regarding box sizes and stacking requirements.

The apparatus preferably includes a sensor for a box top, to inhibit descent of the grab on picking up a box, and also to ensure a box truly is located between the grippers at the pick-up station on each operating cycle. The apparatus may have more than one pair of grippers dependent upon the box size and packed weight as well as the maximum permissible lateral crushing force which may be applied to the sides of the box, and for some applications it may be desirable to enhance the lifting effect of the grippers by means of vacuum lifting pads arranged to act on the top of a box being lifted.

One particular preferred method of this invention will now be set out in great detail, by way of illustration only. Referring initially to FIGS. 1 to 8, there is illustrated diagramatically a grab 15 comprising a main body 16, and two substantially flat gripper plates 17 and 18, supported on rods 19 and 20 for linear sliding movement. The grab 15 is arranged so that either gripper plate 17 or 18 may be moved towards the other gripper plate independently of each other, for example by means of independent pneumatic ram arrangements (not shown).

The grab 15 is itself supported by a suitable mechanical handling assembly (not shown) so that the grab 15 may be positioned anywhere within a predefined volume. For example, such an assembly may include a horizontally traversable vertical column having a slide movable vertically thereon, an arm projecting laterally from the slide at right angles to the line of movement of the column, and a carriage movable horizontally along the arm. For such an arrangement, the grab 15 should be suspended from the carriage by means of a swivel assembly, permitting the grab to be rotated through 360° about a vertical axis. The grab 15 may therefore be positioned with any required orientation within a volume defined by the limits of travel of the vertical column, the vertical slide and the horizontally-movable carriage.

FIG. 1 shows the first step in a sequence of operation according to this invention. Here, the grab 15 is shown above a box 21 to be loaded into a stack, with the gripper plates 17 and 18 separated to an extent greater than the width of the box 21. As shown in FIG. 1, the grab is lowered until the gripper plates 17 and 18 lie one to each side of the side faces of the box 21.

Gripper plate 17 is then moved towards gripper plate 18 until gripper plate 17 reaches a datum position - which conveniently is when the actuating mechanism for that gripper plate reaches an end stop for its travel. The box 21 is then clamped by moving gripper plate 18 towards gripper plate 17 with a force sufficient to ensure that the box 21 is adequately clamped between the gripper plates to permit the lifting thereof, but not so great as to move gripper plate 17 away from its datum position.

Next, as illustrated diagrammatically in FIG. 4, the grab 15 is raised, so picking up the box 21, and is moved as required in three dimensions and also rotated about a vertical axis, until the box 21 approximately overlies its required final position, but is displaced laterally by a small extent away from any previously deposited boxes in the same layer of the stack being assembled. FIG. 5 shows the lowering of the box 21 until that box is just clear of the surface 22 on which the box is to be deposited - this surface being comprised either by a suitable support such as a pallet, or by the upper surface of an already-deposited layer of boxes in the stack. Also shown in FIG. 5 is a previously-deposited box 23, with box 21 displaced laterally to the right (in the Figure) of that box 23. In view of this lateral displacement of box 21 from its required final position, during the lowering of box 21 there is no risk of collision between box 21 and any previously-laid box (such as box 23) in the same layer.

The position of the grab 15 is then finely adjusted until box 21 has its required final position, whereat gripper plate 17 substantially touches a side face of the previously-laid box 23 in the same layer; gripper plate 18 is then moved away from gripper plate 17 so as to release box 21.

To complete the sequence of operation, grab 15 is then raised from box 21 whereafter gripper plate 17 may be moved away from gripper plate 18, so that on positioning the grab 15 over a further box to be loaded into the stack, the grab may be lowered over that next box, to repeat the cycle of FIGS. 1 to 8.

Most conveniently, the above sequence of operations is fully computer-controlled, including the positioning of each box in each layer of the stack, so that the method may be performed fully automatically without the need for any operator supervision or intervention. Consequently, use of this operating method may lead to considerable economies, reliability and convenience.

Figure 10:
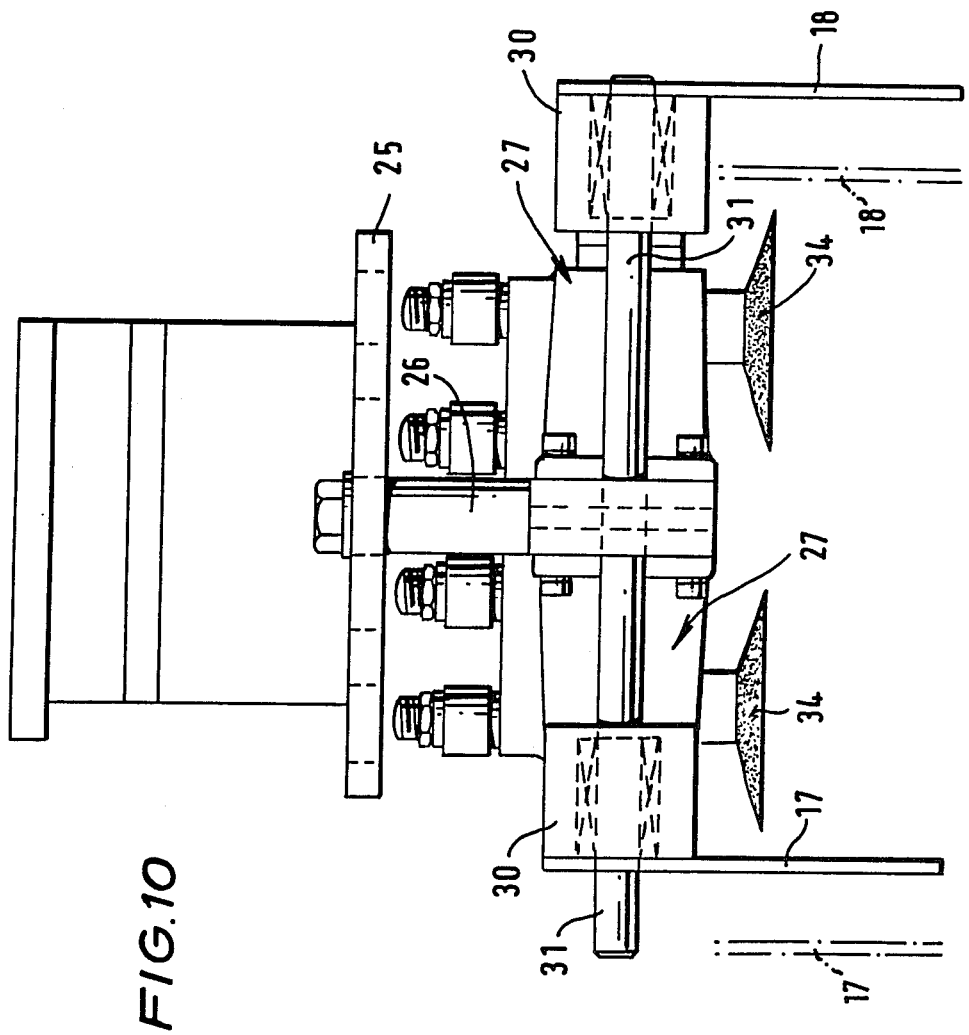
FIG. 10 is an end view on the grab of FIG. 9.
Figure 11:
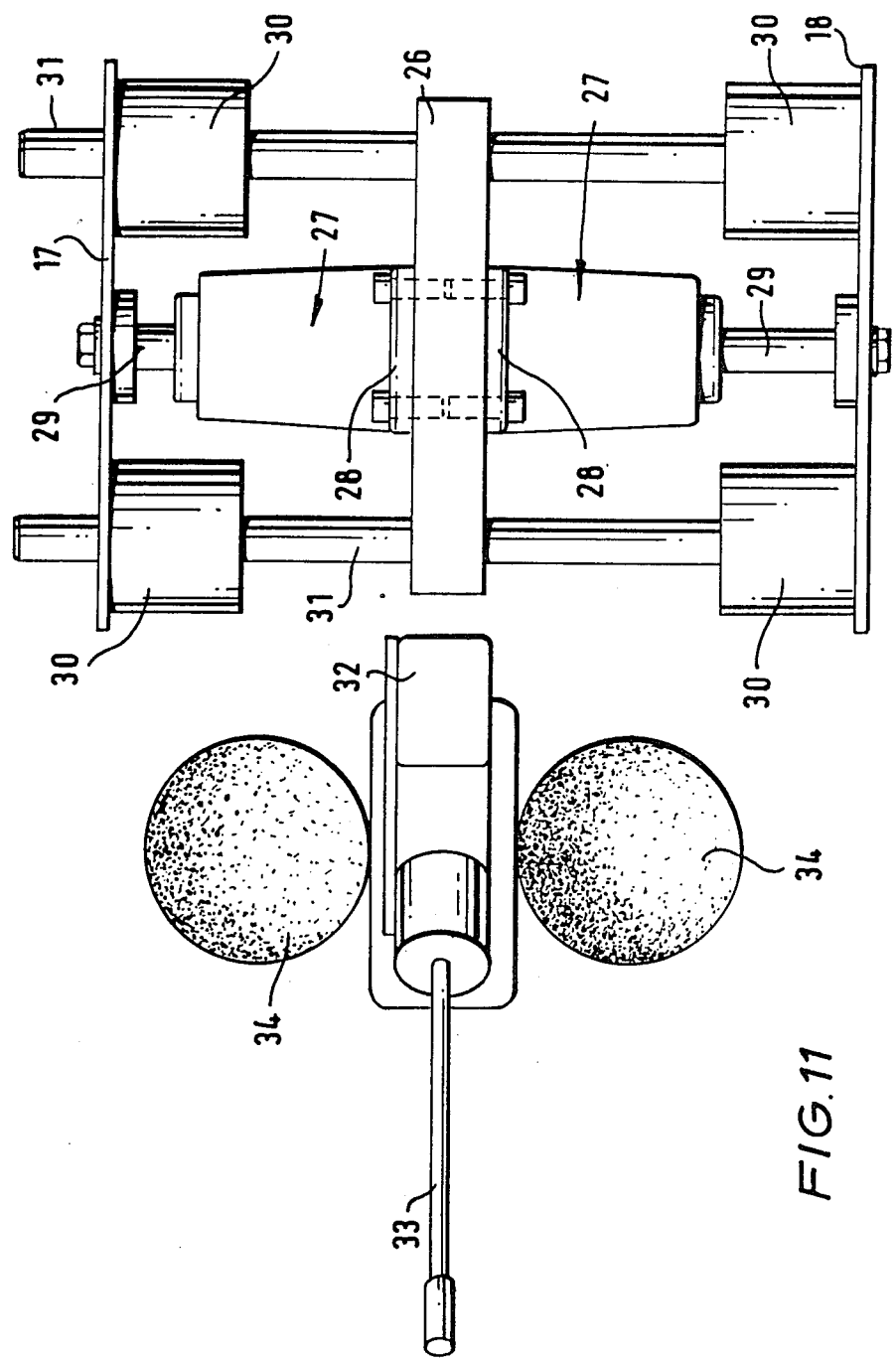
FIG. 11 is an underplan view of the grab of FIGS. 9 and 10.

Turning now to FIGS. 9 to 11, there is shown in some greater detail an example of a grab suitable for use in the method as just described above. The main body 16 of the grab comprises a mounting plate 25, to which are bolted two support brackets 26, both extending vertically downwardly from the plate 25. Each support bracket carries a pair of horizontally-opposed double-acting pneumatic rams 27, the cylinders 28 of the rams being bolted to the bracket 26 and each piston rod 29 being secured at its free end to a respective gripper plate 17 and 18. Each gripper plate 17 and 18 has a pair of bushings 30 secured thereto, a pair of rods 31 being carried by each support bracket 26 and extending through the bushings 30 of each gripper plate 17 and 18, whereby the gripper plates 17 and 18 may be relatively separated or moved closer either independently or in unison, upon expansion or contraction of the associated pneumatic rams 27.

Mounting plate 25 is suitably apertured so as to permit its attachment to a motorised swivel assembly, which latter is secured to the horizontally movable carriage of the overall mechanised handling arrangement.

The grab 15 illustrated in FIGS. 9 to 11 includes two pairs of gripper plates 17 and 18 one pair mounted on each bracket 26 and each of essentially the same construction. The arrangement is however that the two gripper plates 17 on one side of the grab operate in unison, as do the two gripper plates 18 on the other side of the grab, by appropriate interconnection of the rams.

Also illustrated in FIGS. 9 to 11 is a touchsensitive switch 32 including an operating arm 33, the output of this switch being used to inhibit descent of the grab 15 when the operating arm detects the top surface of a box to be lifted. Operation of the cycle is also inhibited if the grab is lowered (FIGS. 1 and 2) and yet no switch output obtained, because no box was present for picking-up.

Illustrated on the grab of FIGS. 9 to 11 is a plurality of suction lifting pads 34 suitable for use with certain types of box or other container not having a porous or irregular upper surface. For such boxes or other containers, there may be no need then to use the gripper plates and so equally no need to perform the operating steps of this invention: for such a case, the gripper plates 17 and 18 would be removed from the grab 15 so as not to interfere with the operation of the apparatus. However, where a particularly heavy box has to be lifted, it may in some circumstances be advantageous to use both the gripper plates and the suction lifting pads in association with each other, the gripper plates 17 and 18 then being caused to follow the operating steps of this invention.

I claim:

1. A method of assembling a stack of boxes using automatically-controlled apparatus including a lifting grab having two independently movable grippers between which the sides of a box may be clamped, which method comprises the steps of:
    (a) moving said grippers to cause the relative separation thereof and then lowering said grab over a box located at a loading station;
    (b) moving one of said grippers towards the other gripper until said one gripper reaches a datum position and then moving said other gripper towards said one gripper until the box is clamped therebetween with a force sufficient to permit the lifting thereof by said grab;

(c) raising said grab together with the clamped box and then moving said grab to a stack assembly station whereat the position of the grab is adjusted so as accurately to position the box held thereby for correct placement in a stack under assembly and with said one gripper alongside a previously-stacked box;

(d) releasing the box by moving said other gripper away from said one gripper; and (e) then raising the grab clear of the box without disturbing the placement thereof.

2. A method according to claim 1, in which each said gripper of the grab is in the form of a substantially flat plate mounted on said grab for linear sliding movement towards and away from the other gripper under the action of at least one pneumatic ram assembly associated with each said gripper.

3. A method according to claim 1, wherein the automatically-controlled apparatus including the lifting grab is computer-controlled, so as to cause the grab and grippers to be moved in three mutually perpendicular directions lying in horizontal and vertical planes, and also rotatable about a vertical axis.

4. A method of assembling a stack of boxes using automatically-controlled apparatus including a lifting grab having two independently movable grippers between which the sides of a box may be clamped, which method comprises the steps of:

(a) moving said grippers to cause the relative separation thereof and then lowering said grab over a box located at a loading station;

(b) moving one of said grippers towards the other gripper until said one gripper reaches a datum position and then moving said other gripper towards said one gripper until the box is clamped therebetween with a force sufficient to permit the lifting thereof by said grab;

(c) raising said grab together with the clamped box and then moving said grab to a stack assembly station whereat the clamped box held by the grab is positioned for correct placement in a stack under assembly by the steps of:

(i) positioning said clamped box next to be stacked vertically above the required final position with the grab being rotated as necessary to have the said clamped box correctly aligned with respect to already-stacked boxes, but with said clamped box displaced laterally by a relatively small extent from previously-stacked boxes against which said clamped box is to lie closely adjacent;

(ii) lowering said clamped box until that box is spaced by a relatively small extent from the surface on which said clamped box is to rest;

(iii) moving said clamped box laterally until said one gripper is in the desired final position and so with said one gripper substantially in the desired vertical plane for the side of sid clamped box being stacked, the grab also being lowered until said clamped box substantially contacts the surface;

(d) releasing said clamped box by moving said other gripper away from said one gripper; and (e) then raising the grab clear of said box without disturbing the placement thereof.

5. A method according to claim 4, wherein each said gripper of the grab is in the form of a substantially flat plate mounted on said grab for linear sliding movement towards and away from the other gripper.

6. A method according to claim 5, wherein at least one pneumatic ram assembly is associated with each said gripper, which ram assembly is suitably disposed to cause the sliding movement thereof.

7. A method according to claim 4, wherein the automatically-controlled apparatus including the lifting grab is computer-controlled, so as to cause the grab and grippers to be moved in accordance with certain directions contained in a program executed by the computer.

8. A method according to claim 7, wherein the grab is movable under the control of the program in three mutually perpendicular directions lying in horizontal and vertical planes, and is also rotatable about a vertical axis.

9. A method according to claim 4, wherein movement of the grab in one direction in positioning said clamped box in the stack under assembly is compounded and performed simultaneously with movement of the grab in a second non-mutually opposed direction also to be performed by the grab in positioning said clamped box.

10. Computer-controlled apparatus for automatically assembling a stack of boxes, which apparatus comprises:
a loading station;
a stacking station;
a grab including two grippers mounted for independent movement towards and away from each other;
first movement means to effect independent movement of said grippers, at least one of said grippers being movable towards and away from a datum position;
second movement means to effect movement of the grab in three mutually perpendicular directions and about a vertical axis within an envelope which includes said loading station and said stacking station; and
a computer processing a pre-determined program of control for said first and second movement means, to enable boxes supplied to said loading station to be picked up one-at-a-time and moved to said stacking station, whereat a stack of the boxes is assembled by controlling the positioning of the grab and then releasing a held box by maintaining one of said grippers at its said datum position but moving the other said gripper away from said one gripper.

11. Apparatus according to claim 10, wherein at least one sensor is provided within the grab for a box top to inhibit descent of said grab at said loading station on detecting the presence of a box between said grippers.

12. Apparatus according to claim 10, wherein vacuum lifting pads are provided on the grab between said grippers to enhance the lifting effect of the grippers.

13. A method of assembling a stack of boxes using computer-controlled apparatus including a lifting grab having two independently movable grippers between which the sides of a box may be clamped, which method is performed by the computer causing the apparatus to perform steps in accordance with a pre-defined program, which steps comprise:

(a) moving said grippers to cause the relative separation thereof and then lowering said grab over a box located at a loading station;

(b) moving one of said grippers towards the other gripper until said one gripper reaches a datum position and then moving said other gripper towards said one gripper until the box is clamped therebetween with a force sufficient to permit the lifting thereof by said grab;

(c) raising said grab together with the clamped box and then moving said grab to a stack assembly station whereat a stack of boxes is under assembly;

(d) positioning said clamped box next to be stacked vertically above the required final position, with the grab being rotated as necessary to have the said clamped box correctly aligned with respect to already-stacked boxes, but with said clamped box displaced laterally by a relatively small extent from previously-stacked boxes against which said clamped box is to lie closely adjacent;

(e) lowering said clamped box until that box is spaced by a relatively small extent from the surface on which said clamped box is to rest;

(f) moving said clamped box laterally until said one gripper is in the desired final position and so with said one gripper substantially in the desired vertical plane for the side of said clamped box being stacked, the grab also being lowered until said clamped box substantially contacts the surface;

(g) releasing said clamped box by moving said other gripper away from said one gripper; and (h) then raising the grab clear of said box without disturbing the placement thereof.

14. A method according to claim 13, in which each said gripper of the grab forming a part of the apparatus is in the form of a substantially flat plate mounted on said grab for linear sliding movement towards and away from the other gripper, at least one pneumatic ram assembly being associated with each said gripper, which ram assembly is suitably disposed to cause the sliding movement of the gripper.

* * * * *